(12) United States Patent
Marshall

(10) Patent No.: US 9,075,967 B2
(45) Date of Patent: Jul. 7, 2015

(54) MOBILE DEVICE SECURITY USING MULTIPLE PROFILES

(71) Applicant: Aaron Marshall, Studio City, CA (US)

(72) Inventor: Aaron Marshall, Studio City, CA (US)

( * ) Notice: Subject to any disclaimer, the term of this patent is extended or adjusted under 35 U.S.C. 154(b) by 70 days.

(21) Appl. No.: 13/731,572

(22) Filed: Dec. 31, 2012

(65) Prior Publication Data

US 2014/0189850 A1 Jul. 3, 2014

(51) Int. Cl.
*G06F 21/00* (2013.01)
*G06F 21/30* (2013.01)
*G06F 21/31* (2013.01)
*G06F 21/32* (2013.01)
*G06F 21/36* (2013.01)

(52) U.S. Cl.
CPC .............. *G06F 21/30* (2013.01); *G06F 21/316* (2013.01); *G06F 21/32* (2013.01); *G06F 21/36* (2013.01)

(58) Field of Classification Search
CPC ..... H04L 67/306; H04L 63/083; H04L 67/34; G06F 21/6254; G06F 21/30; G06F 21/32; G06F 21/36; G06F 21/316
USPC ............................................ 726/17, 2, 7, 19
See application file for complete search history.

(56) References Cited

U.S. PATENT DOCUMENTS

| | | | |
|---|---|---|---|
| 5,719,560 A * | 2/1998 | Watkins .................. | 340/5.5 |
| 6,195,568 B1 | 2/2001 | Irvin | |
| 6,311,063 B1 | 10/2001 | Valliani et al. | |
| 7,277,857 B1 * | 10/2007 | Balaji et al. ................... | 704/270 |
| 8,244,211 B2 | 8/2012 | Clark | |
| 2002/0129283 A1 * | 9/2002 | Bates et al. ................... | 713/202 |
| 2005/0144452 A1 | 6/2005 | Lynch et al. | |
| 2006/0015945 A1 | 1/2006 | Fields | |
| 2006/0177029 A1 | 8/2006 | Dotan et al. | |
| 2006/0234693 A1 * | 10/2006 | Isidore et al. ............. | 455/422.1 |
| 2007/0180492 A1 * | 8/2007 | Hassan et al. ................ | 726/2 |
| 2007/0206569 A1 | 9/2007 | Silver et al. | |
| 2008/0280639 A1 | 11/2008 | Alfia | |
| 2010/0203894 A1 | 8/2010 | Xiao et al. | |
| 2010/0319053 A1 | 12/2010 | Gharabally | |
| 2011/0225638 A1 * | 9/2011 | Nahari .............................. | 726/7 |
| 2011/0321156 A1 * | 12/2011 | Smith ............................ | 726/19 |
| 2012/0072975 A1 | 3/2012 | Labrador et al. | |
| 2012/0159601 A1 | 6/2012 | Dalzell et al. | |
| 2014/0025957 A1 * | 1/2014 | Chen ............................ | 713/184 |

OTHER PUBLICATIONS

Ni, X., Yang, Z., Bai, X., Champion, A. C., & Xuan, D. (Oct. 2009). DiffUser: Differentiated user access control on smartphones. In Mobile Adhoc and Sensor Systems, 2009. MASS'09. IEEE 6th International Conference on (pp. 1012-1017). IEEE.*
Brodkin, VMware to virtualize Android smartphones for business users, Network World, Dec. 7, 2010.
Brodkin, VMware's dual-persona smartphones, phones finally available to purchase, Technology Lab, May 15, 2013.

* cited by examiner

*Primary Examiner* — Syed Zaidi
(74) *Attorney, Agent, or Firm* — Fox Rothschild LLP

(57) ABSTRACT

A mobile electronic device operates in accordance with at least two different application configurations. The device starts by operating in accordance with the first configuration after it receives a first access credential. The first configuration includes a hidden security application. When the device executes the hidden security application, a user may enter a second access credential via the second security application. When the device receives the second access credential, it then switches to a second application configuration.

3 Claims, 6 Drawing Sheets

MOBILE DEVICE SECURITY USING MULTIPLE PROFILES

BACKGROUND

Mobile electronic devices, such as smart phones, tablet computers, and other portable electronic computing devices, generally have security features that enable a user to lock a device out so that unauthorized users cannot use the device, or one or of the device's applications, without entering a password or other token of user authentication.

A problem with current mobile electronic device security systems is that many such systems only permit a single username and passcode to access the device. Alternatively, even if multiple usernames or passcodes are permitted, the functionality of the device remains the same for each user.

This document describes methods and systems that are directed to solving at least some of the issues described above, and/or additional issues.

SUMMARY

In an embodiment, a mobile electronic device operates in accordance with at least two different application configurations. The device starts by operating in accordance with the first configuration after it receives a first access credential. The first configuration includes a hidden security application. When the device executes the hidden security application, a user may enter a second access credential via the second security application. When the device receives the second access credential, it then switches to a second application configuration.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

A "mobile electronic device" refers to a portable computing device that includes an image capturing device, a processor and tangible, computer-readable memory. The memory may contain programming instructions in the form of a software application that, when executed by the processor, causes the device to perform one or image acquisition and processing operations according to the programming instructions. Examples of suitable devices include portable electronic devices such as smartphones, personal digital assistants, cameras, tablet devices, electronic readers, personal computers, media players, satellite navigation devices and the like.

Figure 1:
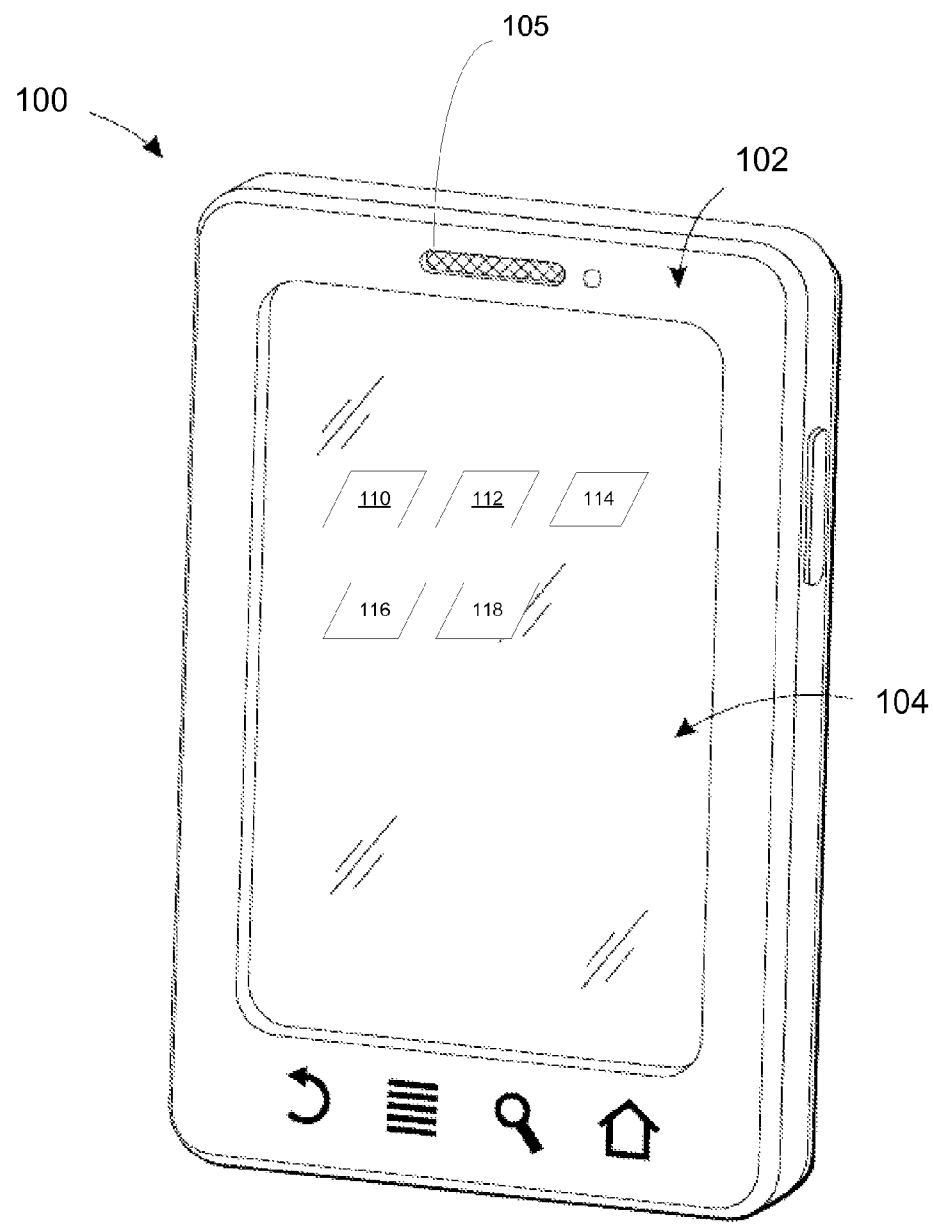
FIG. 1 depicts an example of a mobile electronic device that may use the methods and security systems described in this document.

FIG. 1 shows one example of a mobile electronic device, generally designated 100. The mobile electronic device 100 may include a front face 102 and a display 104. The display 104 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, including, but not limited to, resistive touchscreens, capacitive touchscreens, and infrared touchscreens. The display 104 is one type of user interface that the device may include. The device may include other types of user interfaces such as an audio output 105 such as a speaker or audio port.

The device 100 may be programmed with one or more software applications, each of which may be accessible to a user via the display be user selection of one or more icons. For example, the device may execute a software application that outputs, via the display, real-time weather reports in response to user selection of a weather app icon 110. The device may execute a messaging application such as an email, text messaging, chat, or other two-way communication application in response to user selection of a messaging app icon 112. The device may execute a voice memo application that records and/or transcribes spoken messages in response to user selection of a voice memo app icon 116. The device may execute a calculator application in response to user selection of a calculator app icon 118. Any or all of the icons may correspond to other applications as described below.

Accordingly, the configuration of the mobile device 100 as shown in FIG. 1 and is only an example, and persons skilled in the art will appreciate other configurations that are able to achieve a similar overall result.

The device 100 may be configured to include multiple user profiles, each with a unique feature configuration. When the device is operated in accordance with a first one of the user profiles, a first feature configuration may be active. When the device is operated in accordance with a second one of the user profiles, a second feature configuration may be active instead of the first one, and so on.

As used in this document, a feature configuration refers to a configuration of one or more user-accessible functions of the electronic device. For example, when a first feature configuration is active the device may send and receive communications using a first phone number, e-mail address, messaging system address, or other identifier by which the device may send and receive communications. If so, when a second feature configuration is active the device may use a second and different phone number, e-mail address, messaging system address or other communications identifier. In some embodiments, the device may be equipped with hardware that enables such a configuration, such as with multiple subscriber identity module (SIM) cards, each of which is contains or is associated with a unique serial number, such as a phone number or other mobile subscriber identity. Or, the device may use a single SIM card that permits multiple phone numbers to be used, and one or more software applications may control which phone number the device uses based on the profile that is active at the time.

Each user profile may require entry of a unique access credential. An access credential may be any action or sequence of actions that, when taken, will trigger action of a user profile and allow a user to use the features of the feature configuration that is associated with the profile. For example, an access credential may include any or all of the following: (i) a passcode such as a sequence of numbers, text and/or characters; (ii) a biometric identifier such as a fingerprint or retinal scan; (iii) a recognized image received by a camera of the device, such as a user's face that is recognized using any now or hereafter known facial recognition application; (iv) a recognized voice, spoken word or sequence of spoken words received by a microphone or other audio input of the device and recognized using any now or hereafter known voice recognition application; (v) an expected action or series of actions, such as receipt of user selection of a known sequence of icons, a detected gesture pattern received via a touch-sensitive screen or touch-sensitive pad, or an expected sequence of commands received via a software applications. Additional application-specific examples will be discussed below.

Figure 2:
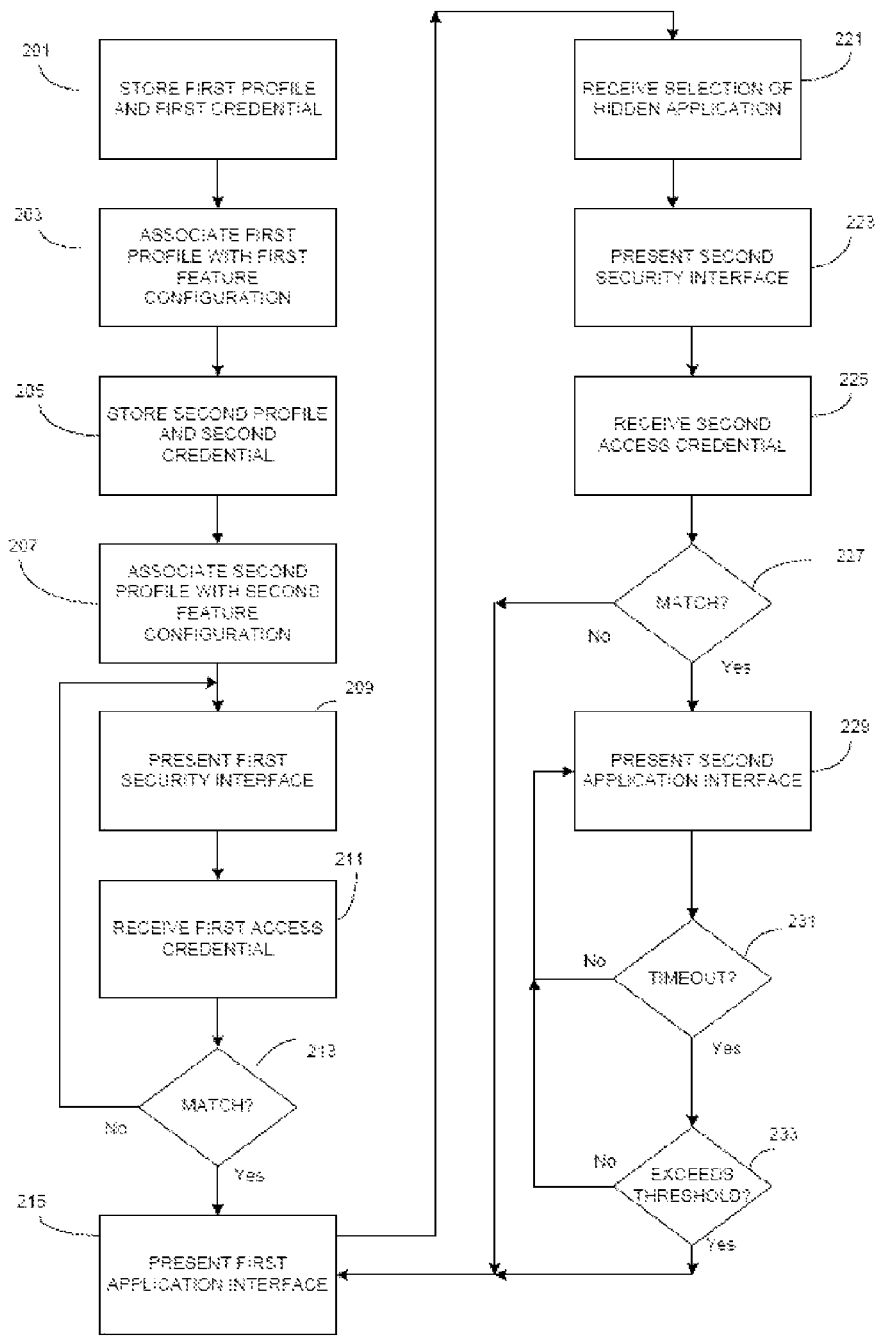
FIG. 2 is a flowchart that illustrates a method of implementing a security system for a mobile electronic device.

Thus, for example and referring to FIG. 2, a method of securing access to a mobile electronic device includes storing 201, in a memory that is accessible to a mobile electronic device, a first user profile so that the first user profile requires a first access credential. The memory may be integral with the device, or it may be accessible to the electronic device via one or more communications networks, such as a remote storage facility as may be used in a cloud communications system. The device will associate the first user profile with a first device feature configuration 203. A second user profile will also be stored in the memory 205. The second user profile will be associated with a second access credential that differs from the first access credential. The device will associate the second user profile with a second device feature configuration that is different from the first device feature configuration 207.

The first access credential, first user profile and first application configuration may be considered default settings that will be used when the device is first powered on. When the device is first powered on, or in some embodiments when the device is transitioned from a sleep or standby state to a wake or active state, the device will display a first security interface 209 where a user may enter the an access credential. When the device receives an access credential via the first interface 211, it will implement programming instructions to determine whether the received access credential matches the first access credential 213. As used in this document, a received access credential "matches" a required credential if it is an exact match, or if it otherwise satisfies one or more criteria that are required by a rule set and/or the required credential. If the received credential matches the first access credential, the system will display or otherwise output a first application interface corresponding to the first device configuration 215. The first application interface will include a first set of icons operative to initiate a set of mobile device applications that correspond to the first configuration.

One of the applications that is presented via the first application interface is a hidden security application. As used in this document, a "hidden security application" is a mobile electronic device software application that includes an icon, name, and/or user interface that does not reveal the application's function as a security application. The application does not appear to be an application having a primary function of securing access to one or more other applications of the device. However, when the hidden application receives an expected authentication credential, it will authenticate the user and transition the device from the first application configuration to a second application configuration. The hidden application may be a home application that is installed with an operating system and not removable by a typical end user of the phone, or it may be an application that is installable and/or removable by the user.

Thus, the first application interface will include a user-selectable icon or other input that, when selected, causes the electronic device to execute the hidden security application. When the device receives a command to execute the hidden security application 217, it will executing the hidden security application so that the device executes a second security interface 221. When the device receives an access credential via the second interface 223, it will implement programming instructions to determine whether the received access credential matches the first access credential 227. If the received credential matches, the system will display or otherwise output a second application interface corresponding to the second device configuration 229. The second application interface includes a first set of icons operative to initiate a plurality of mobile device applications in accordance with the second configuration. The second configuration may differ from the first in that the two configurations may include different applications, may exhibit different application icon layouts, may correspond to different phone numbers, and/or may have different messaging addresses. If the received credential does not match, the device will continue to present and operate in accordance with the first application configuration.

In some embodiments, when or in addition to associating the first profile with the first feature configuration 203, the device may associate a first phone number or unique messaging identification code with the first user profile. Similarly, when or in addition to associating the second profile with the second feature configuration 203, the device may associate a second phone number or unique messaging identification code with the second user profile. The second phone number or code will differ from the first phone number or code.

This, in some embodiments, when operating in accordance with the first application interface, the system may configure a voice call application of the device to operate using the first phone number. When operating in accordance with the second application interface, the system may configure a voice call application of the device to operate using the second phone number.

Figure 3:
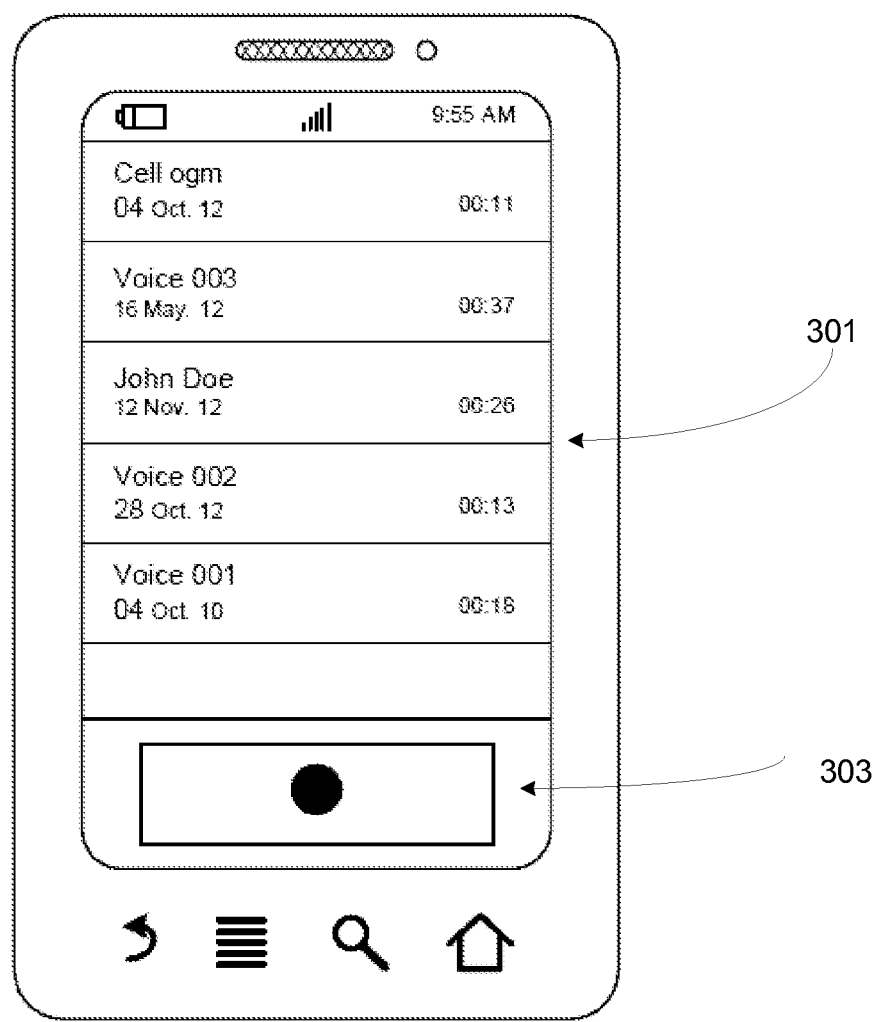
FIGS. 3, 4 and 5 illustrate various examples of hidden security applications.
Figure 4:
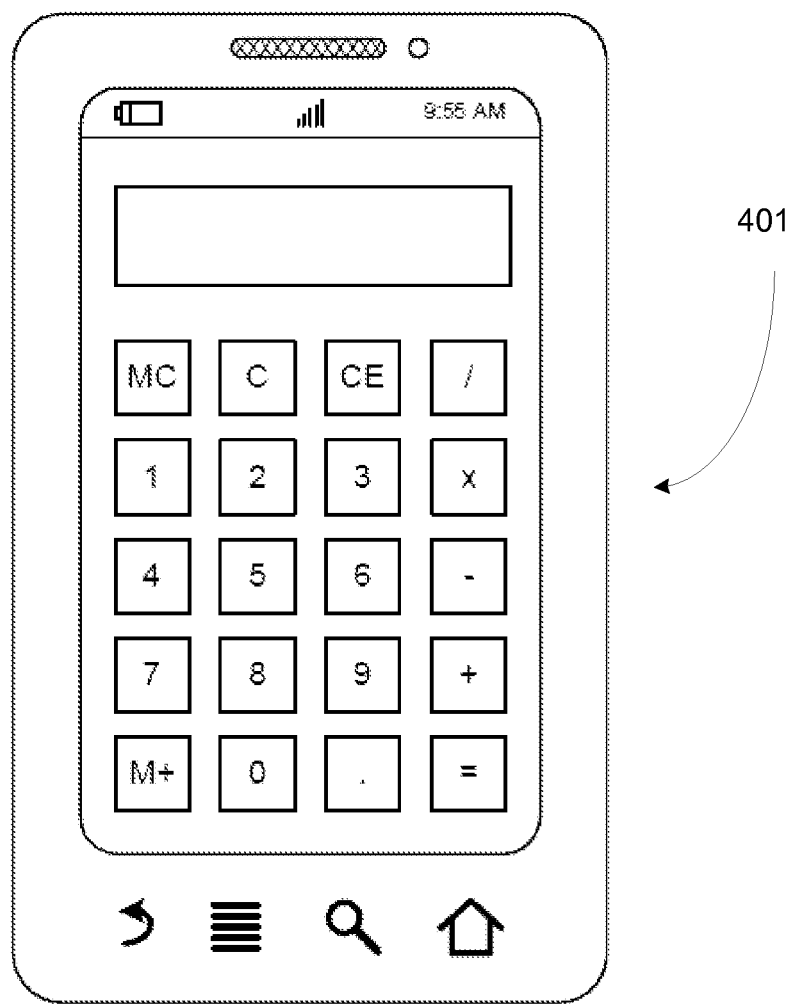

As illustrated in FIG. 3, as an example of a hidden security application, in some embodiments the hidden security application may be a voice memo application 301. If so, the second security interface may include a speech recognition application and a microphone 303. If so, the second access credential may be a predetermined set of one or more spoken words. A match may exist if the application receives audio input that matches the predetermined set of one or more spoken words In other embodiments, as illustrated in FIG. 4, the hidden security application may be a calculator application. If so, the second security interface may include a set of input keys 401 corresponding to a calculator. The second access credential may be a predetermined mathematical function received via activation of some combination of the keys, such as "12.5+ 2.3," "3.464", "12/3.3" or any other function.

Figure 5:
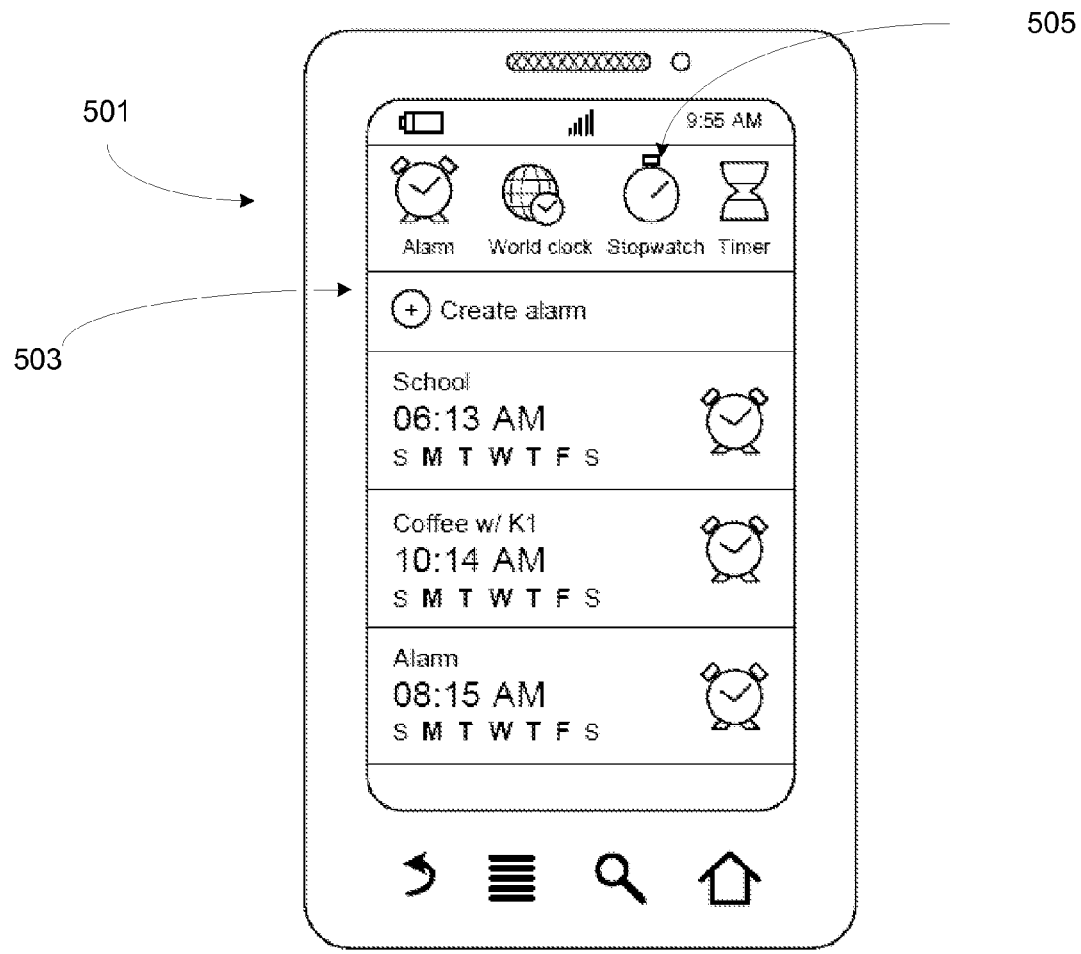

In some embodiments, as illustrated in FIG. 5, the hidden security application may be a clock application having an alarm function 501. If so, the second security interface may include an alarm setting interface 503 and the second access credential may include receipt, via the alarm setting interface, of an expected sequence of alarm times, such as "6:05 am" followed by a change to a different time of "5:06 am". Alternatively or in addition, the clock application may include a time lapse function, such as that of a stopwatch 505. If so, the second access credential may include receipt of "clock stop" and/or "start" commands in an expected sequence at expected times or expected spaces between times. For example, the system may expect to receive two stop commands, three seconds apart.

In some embodiments, the hidden security application may include a messaging application. If so, the second security interface may include a keyboard, keypad, microphone, and/or other input user interface for the messaging application. The second access credential may include receiving, via the input interface, a predetermined or otherwise expected sequence of characters, words, and/or phrases.

In some embodiments, the hidden security application may include a contacts database application. If so, the second security interface may include a keypad or other user interface by which for the contacts application, and the second access credential may include receiving, via the input interface, a predetermined or otherwise expected selection of a sequence of contacts or one or more of the contacts. For example, one contact in the database may be a decoy that, when selected, triggers implementation of the second application interface.

In some embodiments, the hidden security application may include a calendar application. If so, the second security interface may include a calendar, and the second access credential may include receiving, via the calendar, a selection of a predetermined or otherwise expected sequence of one or more dates. Examples include "October 31" followed by "September 24," or "Thursday" followed by "Monday" followed by "Saturday."

In some embodiments, the hidden security application may include a voice call application. If so, the second security interface may include a voice call application keypad, and the second access credential may include receiving, via the keypad or another user interface, a selection of a predetermined sequence of characters.

In some embodiments, the hidden security application may include a map application. If so, the second security interface may include an interactive map interface, and the second access credential may include receiving, via the interactive map interface, a selection of an expected sequence of geographic locations.

In some embodiments, the hidden security application may include a financial investments application. If so, the second security interface may include a financial investments interface configured to display identifying information for a set of tradeable securities. The second access credential comprises receiving, via the financial investments interface, a selection of an expected sequence of securities.

In other embodiments, the hidden security application may be a notes application, such as a voice memo application or a text-based note-taking application. If so, the second security interface may include a set of input keys and/or an audio input. The second access credential may be a predetermined sequence of characters and/or words received by the notes application.

In other embodiments, the hidden security application may be a personal assistant application, such as the Siri application available on the Apple iOS. If so, the second security interface may include a set of input keys and/or an audio input. The second access credential may be a predetermined sequence of characters and/or words received by the personal assistant application.

Any or all of the examples described above may be combined and implemented in sequence, or as various options, by the hidden security application.

Returning to FIG. 2, in some embodiments, when operating in the second application configuration, if the device does not experience any activity or receive a user input, it may timeout 231 and move to a sleep mode such as a screensaver or similar inactive state. If so, the device may return to the first application interface or the hidden security application. If not, it may remain in the second application configuration. In some embodiments, the system will remain in the second configuration so long as the timeout period remains below a threshold period of time. If the timeout period exceeds the threshold period of time 233, the device may return to a state of the first application configuration.

In addition, in some embodiments, when operating in the second application configuration, one or more of the applications available on the device may operate as a "revert" command rather than an actual application. When the "revert" application is selected, the device may revert from the second configuration to the first configuration. For example, referring to FIG. 1, an icon for what appears to be a messaging application 112 may instead act to operate the command to revert to the first configuration when selected.

In addition, in some embodiments one or more screens of either configuration may be displayed in a manner that when a user applies a predetermined gesture to that screen, the device will switch from the second application configuration to the first application configuration, or vice versa. An example of such a gesture is a bottom-to-top or top-to-bottom swipe on a home screen. Alternatively the hidden application may be programmed to activate the second application configuration upon receipt of the gesture. For example, a messaging application may switch the configuration when it is operating and a full left-to-right swipe on the screen is detected.

In some embodiments, the device, or a remote application, may include programming instructions to detect and store messages and missed call information for messages and phone calls that are received for the non-activated application configuration. For example, when the device is operating in the first application configuration, the device or a remote server may store text messages, e-mails, voice messages, missed call information and other communications that are received from the second application configuration. Then, when the device is switched to the second application configuration, the device may present a list, summary or other indicia of the missed communications to the user via the display and/or an audio output.

Figure 6:
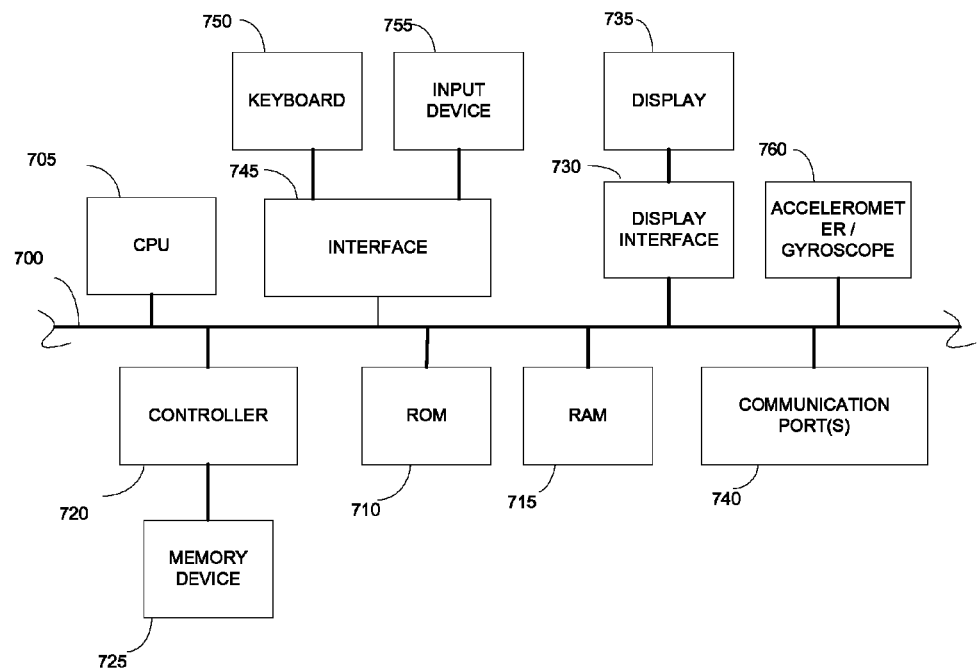
FIG. 6 depicts various embodiments of hardware that may be included in a mobile electronic device.

FIG. 6 depicts an example of internal hardware that may be used to contain or implement the various computer processes and systems as discussed above. For example, mobile device 100 as discussed above may include a similar internal hardware architecture to that as illustrated in FIG. 6. An electrical bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 6, is a processing device, computing device or processor as such terms are used within this disclosure. Read only memory (ROM) 710 and random access memory (RAM) 715 constitute examples of memory devices.

A controller 720 interfaces with one or more optional memory devices 725 that service as date storage facilities to the system bus 700. These memory devices 725 may include, for example, an external DVD drive or CD ROM drive, a hard drive, flash memory, a USB drive or another type of device that serves as a data storage facility. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device.

The features and functions described above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of securing access to a mobile electronic device, the method comprising:
    storing, in a memory of a mobile electronic device, a first user profile so that the first user profile requires a first access credential;
    associating, by a processor of the mobile electronic device, the first user profile with a first device feature configuration;
    storing, in the memory of the mobile electronic device, a second user profile so that the second user profile is associated with a second access credential that differs from the first access credential;
    associating, by the processor, the second user profile with second device feature configuration that is different from the first device feature configuration;
    by the processor, causing the device to display a first security interface;
    by the processor, receiving the first access credential;
    by the processor, in response to receiving the first access credential via the first security interface, outputting a first application interface corresponding to the first device configuration, the first application interface including a first set of icons operative to initiate a plurality of mobile device applications, wherein one of the applications is a hidden security application, and wherein the hidden security application comprises a clock application that comprises an alarm function;
    receiving, by the processor, a command to execute the hidden security application;
    executing, by the processor, the hidden security application so that the device executes a second security interface, wherein the second security interface comprises an alarm setting interface;
    by the processor, receiving the second access credential, wherein receiving the second access credential comprises receiving, via the alarm setting interface, an expected sequence of alarm times; and
    by the processor, in response to receiving the second access credential via the second security interface, outputting a second application interface corresponding to the second device configuration, the second application interface including a second set of icons operative to initiate a plurality of mobile device applications.

2. A method of securing access to a mobile electronic device, the method comprising:
    storing, in a memory of a mobile electronic device, a first user profile so that the first user profile requires a first access credential;
    associating, by a processor of the mobile electronic device, the first user profile with a first device feature configuration;
    storing, in the memory of the mobile electronic device, a second user profile so that the second user profile is associated with a second access credential that differs from the first access credential;
    associating, by the processor, the second user profile with second device feature configuration that is different from the first device feature configuration;
    by the processor, causing the device to display a first security interface;
    by the processor, receiving the first access credential;
    by the processor, in response to receiving the first access credential via the first security interface, outputting a first application interface corresponding to the first device configuration, the first application interface including a first set of icons operative to initiate a plurality of mobile device applications, wherein one of the applications is a hidden security application, and wherein the hidden security application comprises a clock application that comprises a stop watch function;
    receiving, by the processor, a command to execute the hidden security application;
    executing, by the processor, the hidden security application so that the device executes a second security interface, wherein the second security interface comprises a stop/start interface;
    by the processor, receiving the second access credential, wherein receiving the second access credential comprises receiving, via the stop/start interface, an expected sequence of clock stop commands; and
    by the processor, in response to receiving the second access credential via the second security interface, outputting a second application interface corresponding to the second device configuration, the second application interface including a second set of icons operative to initiate a plurality of mobile device applications.

3. A method of securing access to a mobile electronic device, the method comprising:
    storing, in a memory of a mobile electronic device, a first user profile so that the first user profile requires a first access credential;
    associating, by a processor of the mobile electronic device, the first user profile with a first device feature configuration;
    storing, in the memory of the mobile electronic device, a second user profile so that the second user profile is associated with a second access credential that differs from the first access credential;

associating, by the processor, the second user profile with second device feature configuration that is different from the first device feature configuration;

by the processor, causing the device to display a first security interface;

by the processor, receiving the first access credential;

by the processor, in response to receiving the first access credential via the first security interface, outputting a first application interface corresponding to the first device configuration, the first application interface including a first set of icons operative to initiate a plurality of mobile device applications, wherein one of the applications is a hidden security application;

receiving, by the processor, a command to execute the hidden security application;

executing, by the processor, the hidden security application so that the device executes a second security interface;

by the processor, receiving the second access credential; and by the processor, in response to receiving the second access credential via the second security interface, outputting a second application interface corresponding to the second device configuration, the second application interface including a second set of icons operative to initiate a plurality of mobile device applications, wherein:
the hidden security application comprises a financial investments application;
the second security interface comprises a financial investments interface configured to display identifying information for a plurality of tradeable securities; and
the second access credential comprises receiving, via the financial investments interface, a selection of a predetermined sequence of securities.

* * * * *